United States Patent [19]
Daudelin et al.

[11] Patent Number: 5,177,737
[45] Date of Patent: Jan. 5, 1993

[54] MULTIPURPOSE BUS SYSTEM

[75] Inventors: Douglas S. Daudelin, Neptune, N.J.; Mark A. Johnson, Boulder, Colo.; Walter M. Pitio, Old Bridge, N.J.

[73] Assignee: AT&T Bell Laboratories, Murray Hill, N.J.

[21] Appl. No.: 734,022

[22] Filed: Jul. 22, 1991

Related U.S. Application Data

[63] Continuation of Ser. No. 459,495, Jan. 2, 1990, abandoned.

[51] Int. Cl.⁵ .......................... H04Q 11/04; H04J 3/02
[52] U.S. Cl. .................................... 370/67; 370/85.1; 370/85.7
[58] Field of Search ............... 370/60, 60.1, 66, 67, 370/68, 68.1, 77, 85.1, 85.9, 85.11, 94.1, 94.2, 85.7, 95.1

[56] References Cited

U.S. PATENT DOCUMENTS

| | | | |
|---|---|---|---|
| 4,535,448 | 8/1985 | Baxter et al. | 370/94.1 |
| 4,574,284 | 3/1986 | Feldman et al. | 370/85.1 |
| 4,597,074 | 6/1986 | Demichelis et al. | 370/67 |
| 4,608,685 | 8/1986 | Jain et al. | 370/94.2 |
| 4,653,047 | 3/1987 | Vij et al. | 370/67 |
| 4,661,952 | 4/1987 | von Sichart et al. | 370/94.2 |
| 4,677,611 | 6/1987 | Yanosy, Jr. et al. | 370/85.7 |
| 4,680,754 | 7/1987 | Fechalos | 370/85.1 |
| 4,719,622 | 1/1988 | Whipple et al. | 370/85.1 |
| 4,792,941 | 12/1988 | Yanosy, Jr. et al. | 370/67 |
| 4,809,270 | 2/1989 | Baxter et al. | 370/85.7 |
| 4,885,741 | 12/1989 | Douskalis | 370/67 |

OTHER PUBLICATIONS

"An Introduction to ISN: Information Systems Network, Issue Z", Nov. 1987, AT&T Customer Information Center,(order #555-300-020).

Primary Examiner—Douglas W. Olms
Assistant Examiner—Alpus H. Hsu
Attorney, Agent, or Firm—David R. Padnes

[57] ABSTRACT

A multipurpose bus connects subsets of intercommunicating modular circuit packs in a complex electrical system. An individual one of the subsets may use the bus leads to transport signals differently from the other subsets. Each of the subsets of the circuit packs is selected to use the bus in particular time intervals. The subset, thus selected, uses the bus leads the way its own protocol governs during those particular time intervals and otherwise ignores the bus.

32 Claims, 6 Drawing Sheets

MULTIPURPOSE BUS SYSTEM

This application is a continuation of application Ser. No. 07/459,495, filed on Jan. 2, 1990, now abandoned.

TECHNICAL FIELD

This invention relates to electrical systems which utilize buses to electrically interconnect modular circuit packs.

BACKGROUND OF THE INVENTION

A complex electrical system is oftentimes designed to include a plurality of modular circuit packs. These circuit packs, which individually perform well-defined integral functions for the system, work synergistically to realize various system capabilities. This design approach allows a system to be flexibly configured by the selection of various combinations of modular circuit packs.

Modular circuit packs in a system are typically assembled in a frame, specifically, in plug-in slots which are defined by circuit pack guides. The circuit packs are connected to one or more buses which are wired on a backplane of the frame and via which electrical signals are intercommunicated between the circuit packs. To this end, a connector on a circuit pack mates mechanically and electrically with a corresponding backplane connector at the end of a plug-in slot. This backplane connector, depending on the number of contacts it has, may be connected to one or more of the buses on the backplane.

The above-described design approach is most advantageous for a simple electrical system that requires only one bus. It is not so, as explained hereinbelow, for a complex electrical system which normally requires a plurality of buses to accommodate different schemes for communications between individual circuit packs. These schemes may be, for example, a time-division-multiplexed scheme, a data packetized scheme, etc., wherein each scheme is associated with a different bus configuration. Each bus configuration specifies the functions of the individual leads of a bus, and restricts, for example, the signal waveforms from a circuit pack to drive the individual bus leads.

The foregoing variety of bus configurations unduly limits system expansion. This limitation arises because it is normally uneconomical to have the backplane connector of each plug-in slot connected to all of the differently configured buses within the system since only a subset of these buses is used by any circuit pack. Indeed, it is more economical to have different types of plug-in slots where each type of plug-in slot is wired to a particular subset of the different buses and these subsets are chosen to be usable by one or more of the circuit packs. Because the plug-in slots of different types are not interchangeable, one must reserve additional slots to anticipate system expansion. However, due to the uncertainty inherent in the forecast of future circuit pack usage, the determination of the number reserved for each type of slot is, at best, speculative. It is very likely that new circuit packs which are subsequently added for system expansion may exhaust the reserved slots of a particular type while many of the other types remain unused. The further need of circuit packs that require that particular type of slot often causes a system user to wastefully replace the whole system. More significantly, as technology evolves, it is oftentimes desirable to enhance the capability of a system in use by the addition of circuit packs requiring a bus configuration not originally contemplated. As a consequence thereof, the system user who desires the enhanced capability is faced with no choice but to, again, wastefully replace the current system with one of a newer model, which will probably be replaced in the near future for the same above-stated limitation.

Accordingly, it is desirable to have a bus arrangement capable of supporting a plurality of bus configurations, which does not require accurate forecast of future circuit pack usage and which can readily accommodate one or more of bus configurations not originally contemplated.

SUMMARY OF THE INVENTION

The present invention overcomes the prior art limitations of systems which utilize modular circuit packs and which have, heretofore, required a plurality of buses, each associated with a different bus configuration. In accordance with the present invention, the plurality of required buses are replaced by one multipurpose bus which can provide a plurality of different bus configurations in different time intervals. These different bus configurations may even include those that are not originally contemplated. The number of leads in this multipurpose bus is a function of the maximum number of leads required by any one of the plurality of bus configurations accommodated.

An advantage of the present invention is that the modular circuit packs are received by plug-in slots whose backplane connectors are identically wired to the multipurpose bus. Thus, any plug-in slot can receive any modular circuit pack.

DETAILED DESCRIPTION

Figure 1:
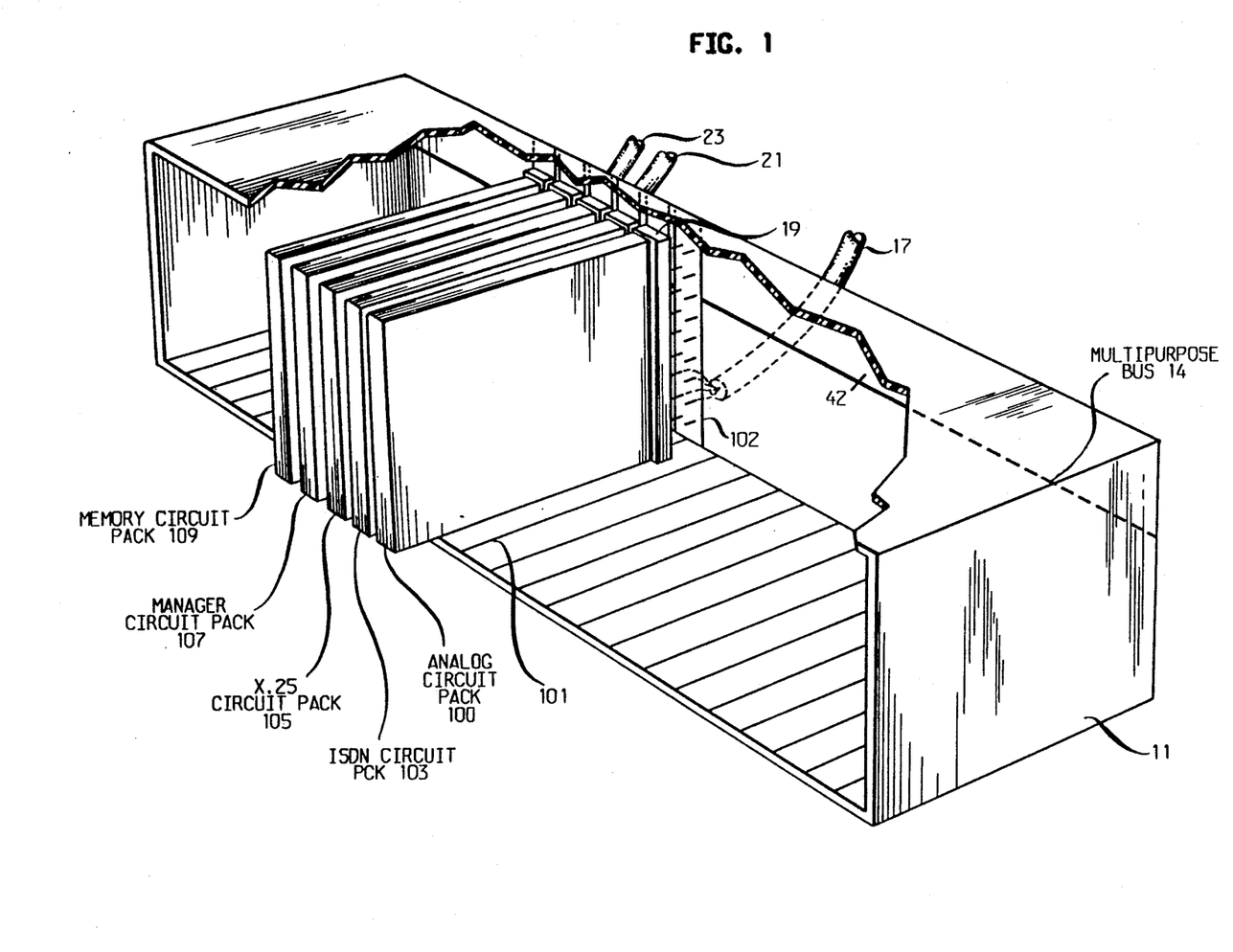
FIG. 1 illustrates the physical structure of a system switch embodying the principles of the present invention.

FIG. 1 illustrates the physical structure of an electrical system 10 embodying the principles of the present invention. System 10 comprises, inter alia, five modular plug-in circuit packs which are, specifically, analog circuit pack 100, integrated services digital network (ISDN) circuit pack 103, X.25 circuit pack 105, manager circuit pack 107 and memory circuit pack 109. These circuit packs, which are described in further detail hereinbelow, provide various system capabilities and features to a variety of external devices. The circuit packs are assembled in a shelf 11 of a rectangular prismatic frame. Shelf 11 comprises plug-in slots defined by circuit pack guides 101, a backplane with backplane connectors and a multipurpose bus 14 whose leads are printed on the backplane. Each backplane connector, for example, backplane connector 102, has a first set of pins which are individually wired to a predetermined number of leads of multipurpose bus 14. In this particular illustrative embodiment, there are forty-two such leads. A second set of pins of a backplane connector are sometimes wired to form an external interface cable. In the present embodiment, fifty such pins are wired to form external interface cable 17. The modular plug-in circuit packs containing circuit wirings slide onto guides 101.

As specifically called out in FIG. 1, analog circuit pack 100 is equipped with circuit pack connector 19. The latter mates mechanically by inserting into the pins of the corresponding backplane connector 102. By doing so, the wiring on circuit pack 100 is connected to multipurpose bus 14 and to external interface cable 17. In the same manner, circuit packs 103, 105, 107 and 109 are connected to multipurpose bus 14 and in addition, circuit packs 103 and 105 are respectively connected to external interface cables 21 and 23. These cables enable the circuit packs to communicate with external devices which are served by system 10.

Figure 2:
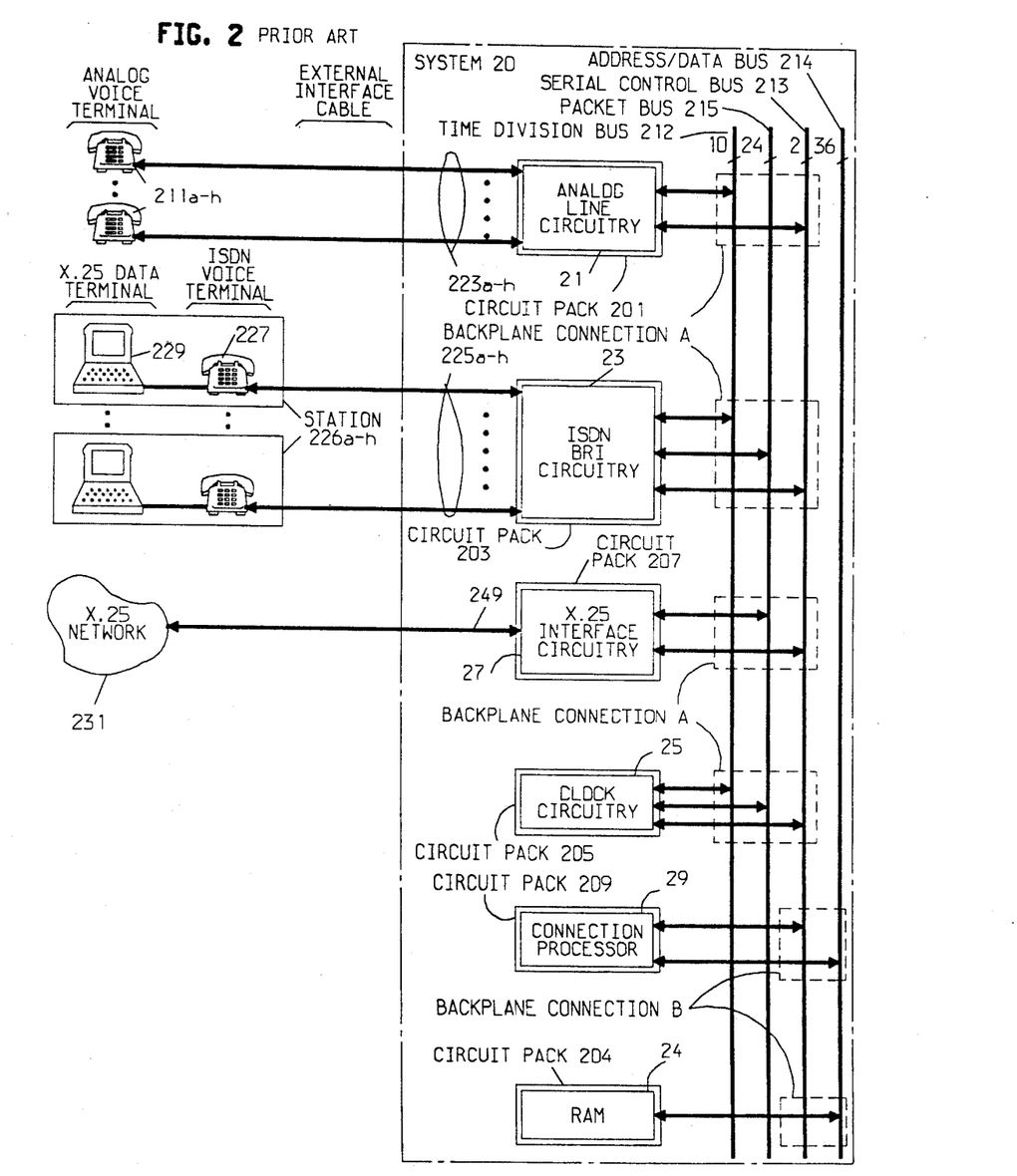
FIG. 2 is a block diagram of a system switch according to principles known to the prior art.

System 10 is illustratively used to switch various types of voice and data traffic between external devices. A prior art system which provides the same functionalities as system 10 normally requires a plurality of distinct buses, as opposed to only one bus such as multipurpose bus 14 in system 10. FIG. 2 shows a block diagram representing such a prior art system which is denoted system 20. Central to the operation of system 20 are six circuitries, each of which is assembled on a modular plug-in circuit pack whose physical structure is described hereinbefore. Specifically, these six circuitries are analog line circuitry 21 on circuit pack 201, ISDN basic rate interface (BRI) circuitry 23 on circuit pack 203, X.25 interface circuitry 27 on circuit pack 207, clock circuitry 25 on circuit pack 205, connection processor 29 on circuit pack 209 and random access memory (RAM) 24 on circuit pack 204.

External devices as well as the circuit packs themselves intercommunicate over a plurality of system buses. As seen in FIG. 2, there are four such buses which are time division bus 212, packet bus 215, serial control bus 213 and address/data bus 214. These different buses are utilized to facilitate different types of communications. For example, external devices generating synchronous traffic, that is, continuous rates of traffic which must be delivered with a constant delay, communicate over time division bus 212. External devices generating asynchronous traffic, that is, traffic which is bursty in nature and the delay between deliveries of individual bursts is not critical, communicate over packet bus 215.

More specifically, time division bus 212 is of conventional design and is comprised of ten leads carrying, respectively, a clock signal, a frame signal, and eight parallel information bits. The clock signal is of frequency 2.048 MHz generated by clock circuitry 25 on circuit pack 205. Use of bus 212 is time divided into frames of 256 time slots. During each time slot, eight information bits are transported over bus 212. The length of the time slot is one clock cycle or $1/2.048$ MHz = 488 ns. Thus, the frames repeat at a frequency of $2.048 \times 10^6/256 = 8$ kHz. This 8 kHz frame signal is also provided by clock circuitry 25. The detailed circuitry and mechanism necessary to access time division bus 212 are fully described in U.S. Pat. No. 4,809,270, issued Feb. 28, 1989, to Baxter, et al., hereby incorporated by reference.

Serial control bus 213 is comprised of two leads denoted serial clock and serial data. The serial clock lead conveys a clock signal of 9.6 kHz provided by clock circuitry 25. The serial data lead serves as a synchronous, 9.6 kb/s, half duplex link over which connection processor 29 communicates administrative messages with circuit packs 201, 203 and 207. These messages indicate to those circuit packs, for example, the destination of currently processed calls, necessary gain adjustments for those calls, etc. Other functions of connection processor 29 are described in further detail hereinbelow.

Address/data bus 214 is comprised of thirty-six leads, sixteen of which are for memory address, another sixteen of which are for data, and the last four of which are for standard control/handshaking signals, specifically, data valid, address valid, read/write and data transfer acknowledge signals. These control/handshaking signals in conjunction with the memory address enable connection processor 29 to write and read, over the data leads of bus 214, to and from any specific memory location of RAM 24.

Packet bus 215 is comprised of twenty-four leads transporting five individual control signals, two parity bits, sixteen data bits, and a clock signal of frequency 1 MHz generated by clock circuitry 25. Packet bus 215 is a synchronous, contention bus where arbitration for use of the bus is required. Such a bus is described in "An Introduction to ISN: Information System Network, Issue 2", November, 1987, AT&T Customer Information Center, (Order #555-300-020), hereby incorporated by reference.

As mentioned before, these buses serve as communication links between devices external to system 20. The various modular circuit packs in system 20 provide necessary interfaces and processing to enable the external devices to intercommunicate over the buses. To this end, analog line circuitry 21 within circuit pack 201 on one side interfaces, for example, to eight external analog voice terminals 211a through h. As illustrated in FIG. 2, the external interface cable from circuit pack 201 has eight individual wire-pairs 223a through h wired to the corresponding analog voice terminals 211a through h. On the other side of circuit pack 201, circuitry 21 interfaces to time division bus 212, and to serial control bus 213. In one direction, analog line circuitry 21 digitizes, in a conventional manner, analog signals received from analog voice terminals 211a through h. Circuitry 21 thereupon generates eight respective 64 kb/s bit streams on to time division bus 212 during assigned time slots. Circuitry 21 also generates via serial control bus 213 messages to connection processor 29 indicating, for example, the digits dialed for the current outgoing calls, the termination of those calls, etc. In the other direction, analog line circuitry 21 receives 64 kb/s bit streams from time division bus 212 and administrative messages from connection processor 29 via serial control bus 213. Based on the received information, analog line circuitry 21 converts the 64 kb/s bit streams to corresponding analog signals and sends the latter over the external interface cable to the appropriate analog voice terminals.

ISDN BRI circuitry 23 within circuit pack 203 on one end provides basic rate interfaces pursuant to a CCITT ISDN standard. Such an interface communicates digitized voice and data at 64 kb/s. Specifically, the external interface cable from circuit pack 203 is divided into eight external basic rate interfaces 225a through h. These interfaces are illustratively connected to respective stations 226a through h, each of which comprises an ISDN voice terminal connected in series with an X.25 data terminal. Circuitry 23 on the other end interfaces to individual time division bus 212, packet bus 215 and serial control bus 213. ISDN BRI circuitry 23 is described in further detail hereinbelow. In this illustrative configuration, ISDN BRI circuitry 23 may arrange communications, for example, between ISDN voice terminal 227 within station 226a and one of the analog voice terminals 211a through h over time division bus 212. At the same time, circuitry 23 may also arrange communications, for example, between X.25 data terminal 229 within station 226a and an X.25 network 231 to be described over packet bus 215. Circuitry 23, similar to circuitry 21, utilizes serial control bus 213 to communicate administrative messages with connection processor 29 to properly establish and switch incoming and outgoing voice/data calls.

X.25 interface circuitry 27 within circuit pack 207, in a standard way, interfaces on one end to X.25 network 231 via X.25 link 249 and on the other end to packet bus 215 and serial control bus 213. It should be noted at this point that each circuit pack in such a system as system 20 is normally identified by an address which is determined by the particular plug-in slot into which the circuit pack is placed. Circuitry 27, specifically, prepends to every packet received from X.25 network 231 the address of a circuit pack for which the packet is destined. This destination address is previously communicated to circuitry 27 by connection processor 29 via serial control bus 213. The packet is thereupon sent by circuitry 27 on to packet bus 215. Circuitry 27 also monitors packets on packet bus 215 for the address of circuit pack 207, and takes in those prepended therewith.

As mentioned before, packet bus 215 is a contention bus. In order to contend for use of the packet bus, X.25 interface circuitry and ISDN BRI circuitry are each equipped with a packet bus interface (not shown in FIG. 2) which implements a standard bus arbitration scheme.

It should be apparent, by now, that connection processor 29 is the one that orchestrates the traffic-switching operation of system 20. Specifically, connection processor 29 coordinates the communications between the external devices served by system 20. To this end, connection processor 29, for example, assigns time slots during which voice terminals associated with circuitries 21 and 23 may intercommunicate over time division bus 212. Processor 29 also provides to individual circuitries of system 20 over serial control bus 213 necessary administrative messages containing operating information, for example, signaling information, information indicating the types of external devices for which the outgoing calls are destined, etc.

Connection processor 209 communicates with RAM 24 on circuit pack 204 over address/data bus 214. RAM 24 has a storage capacity of $2^{16} = 64$ kbytes and serves as an auxiliary memory bank for connection processor 209 to store the operating information.

It is normally uneconomical for a system to have each plug-in slot with a backplane connection made to all of different buses while only a subset of these buses is used by each circuit pack. This being so, system 20 is equipped with first and second types of plug-in slots which are characterized by their associated backplane bus connections denoted, respectively, A and B. As seen in FIG. 2, backplane bus connection A has access to time division bus 212, packet bus 215 and serial control bus 213 while backplane bus connection B has access to serial control bus 213 and address/data bus 214. Thus, circuit packs 21, 23, 25 and 27 are placed into plug-in slots of the first type, and circuit packs 24 and 29 are placed into those of the second type.

The foregoing prior art arrangement unduly limits the potential expansion of a system. Because the slots of different types are not interchangeable, one must reserve additional slots to anticipate system expansion. However, the uncertainty inherent in the forecast of future circuit pack usage, the determination of the number reserved for each type of slots is, at best, speculative. This shortcoming is amplified in a more complicated system which unlike system 20, involves more than two types of plug-in slots. It is conceivable that in an extreme case, the newly added circuit packs exhaust the reserved slots of one type while those of other types remain unused. This precarious planning often causes a system to be wastefully replaced.

Furthermore, even if a system is designed to uneconomically require each plug-in slot to have a backplane connection uniformly made to all of different buses in the system, such a design, nonetheless, cannot accommodate new circuit packs requiring bus configurations not originally contemplated as technology evolves.

The present invention overcomes the foregoing prior art limitations. A system embodying the principles of the present invention utilizes only one bus—a multipurpose bus—of a predetermined number of leads, as opposed to a plurality of buses individually comprising different numbers of leads, to perform the same prior art system function. Advantageously, all the plug-in slots in the inventive system are identical in that the backplane connections thereof are uniformly made to the same multipurpose bus. In addition, the multipurpose bus is time-shared to be flexibly configured as various types of buses, including those not originally contemplated.

Figure 3:
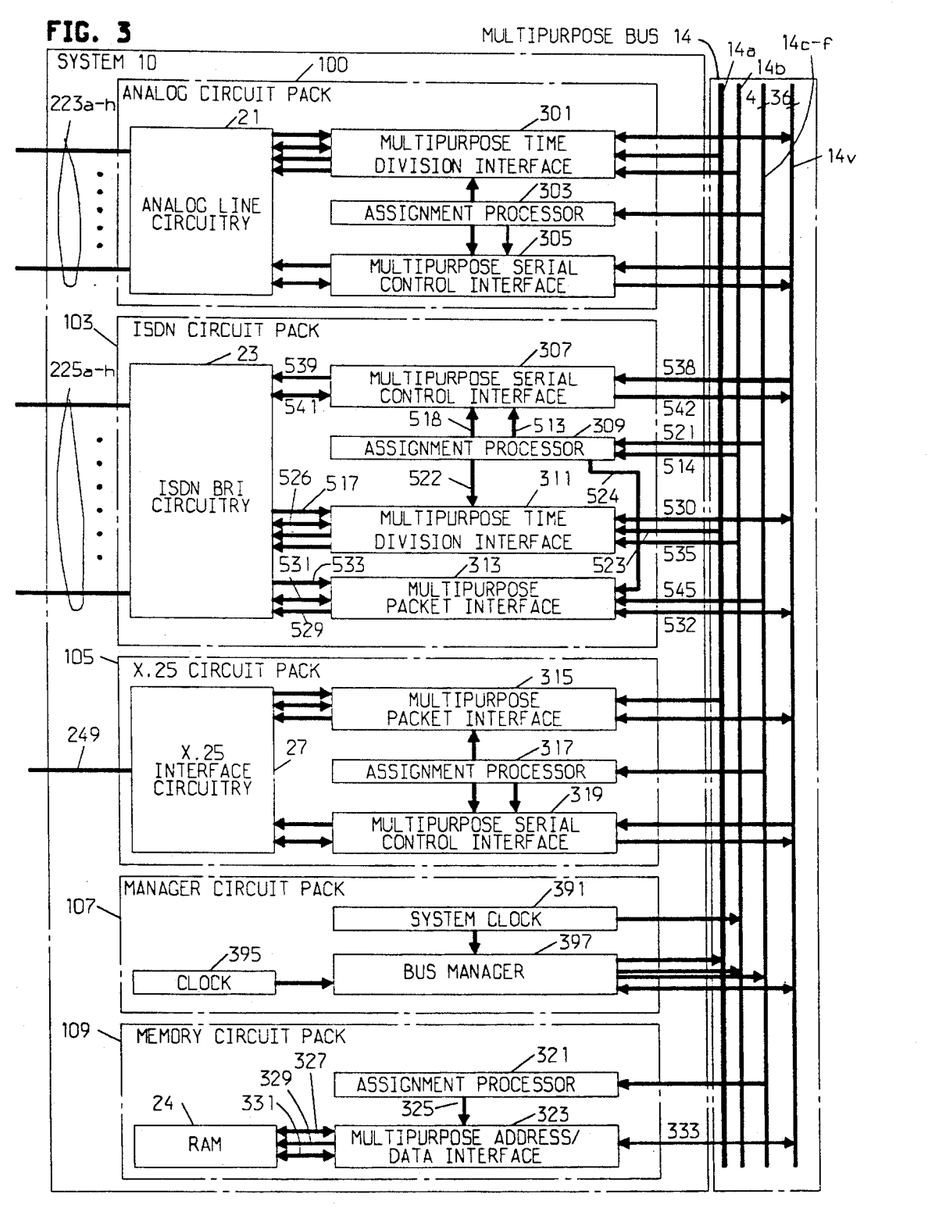
FIG. 3 is a block diagram representing the system of FIG. 1.

FIG. 3 shows a block diagram of system 10 of FIG. 1 which embodies the principles of the present invention. System 10 performs the same aforementioned functions as system 20. Specifically, analog circuit pack 100 comprises analog line circuitry 21 whose external interface is composed of wire pairs 223a through h; ISDN circuit pack 103 comprises ISDN BRI circuitry 23 which carries basic rate interfaces 225a through h; and X.25 circuit pack 105 comprises X.25 interface circuitry 27 which provides X.25 link 249. This being so, system 10 may serve the same external devices as system 20 as described hereinbefore. Moreover, memory circuit pack 109 comprises aforementioned RAM 24, serving bus manager 397 of manager circuit pack 107 similarly to connection processor 29 as previously described.

Yet in accordance with the present invention, system 10 utilizes multipurpose bus 14, rather than four different buses as in system 20. As a consequence, new interfaces for multipurpose bus 14 need to be included in the circuit packs. Accordingly, analog circuit pack 100 further comprises multipurpose time division interface 301 and multipurpose serial control interface 305; ISDN circuit pack further comprises multipurpose serial control interface 307, multipurpose time division interface 311 and multipurpose packet interface 313; X.25 circuit pack 105 further comprises multipurpose packet interface 315, and multipurpose serial control interface 319;

and memory circuit pack 109 further comprises multipurpose address/data interface 323. All of these new interfaces are described in full detail hereinbelow.

Illustratively, multipurpose bus 14 is comprised of forty-two leads, including six dedicated leads denoted 14a, 14b and 14c through f, and thirty-six variable leads denoted collectively 14v. Specifically, dedicated leads 14a, 14b and 14c through f transport, respectively, a superframe signal, a clock signal and four parallel assignment bits to be described.

Central to the operation of multipurpose bus 14 is bus manager 397 on manager circuit pack 107. Bus manager 397 not only performs the same aforementioned functions as connection processor 29 of system 20, but also controls the use of multipurpose bus 14 in a time-sharing manner. That is, in accordance with the present invention, the variable leads of multipurpose bus 14 are flexibly assigned by bus manager 397 to become one type of bus at one instant, another type of bus at another instant, and so on and so forth. During the instant at which the multipurpose bus 14 is assigned to be a particular type of bus, the variable leads of bus 14 would be configured identically to that particular type of bus. Thus, depending on the particular configuration of the bus type, not all of the variable leads of bus 14 are in use at every instant. However, the number of variable leads should be at least the maximum number required by any one of the buses that multipurpose bus 14 might become. (In this instance, as described hereinbelow, multipurpose bus 14 may be configured as address/data bus 214 which takes up the most—thirty-six—leads as described before. Therefore, multipurpose bus 14 in system 10 is required to have a minimum of thirty-six variable leads, which minimum is selected here as the number of variable leads 14v.)

Illustratively, system 10 switches a relatively high volume of synchronous traffic and a relatively low volume of packet traffic, thus requiring high usage of a time division bus and low usage of a packet bus. Accordingly, bus manager 397 in this specific embodiment allocates 60.2% of the time to have the variable leads of multipurpose bus 14 configured as time division bus 212, 11.7% as packet bus 215, 3.1% as serial control bus 213 and 25% as address/data bus 214.

Figure 4:
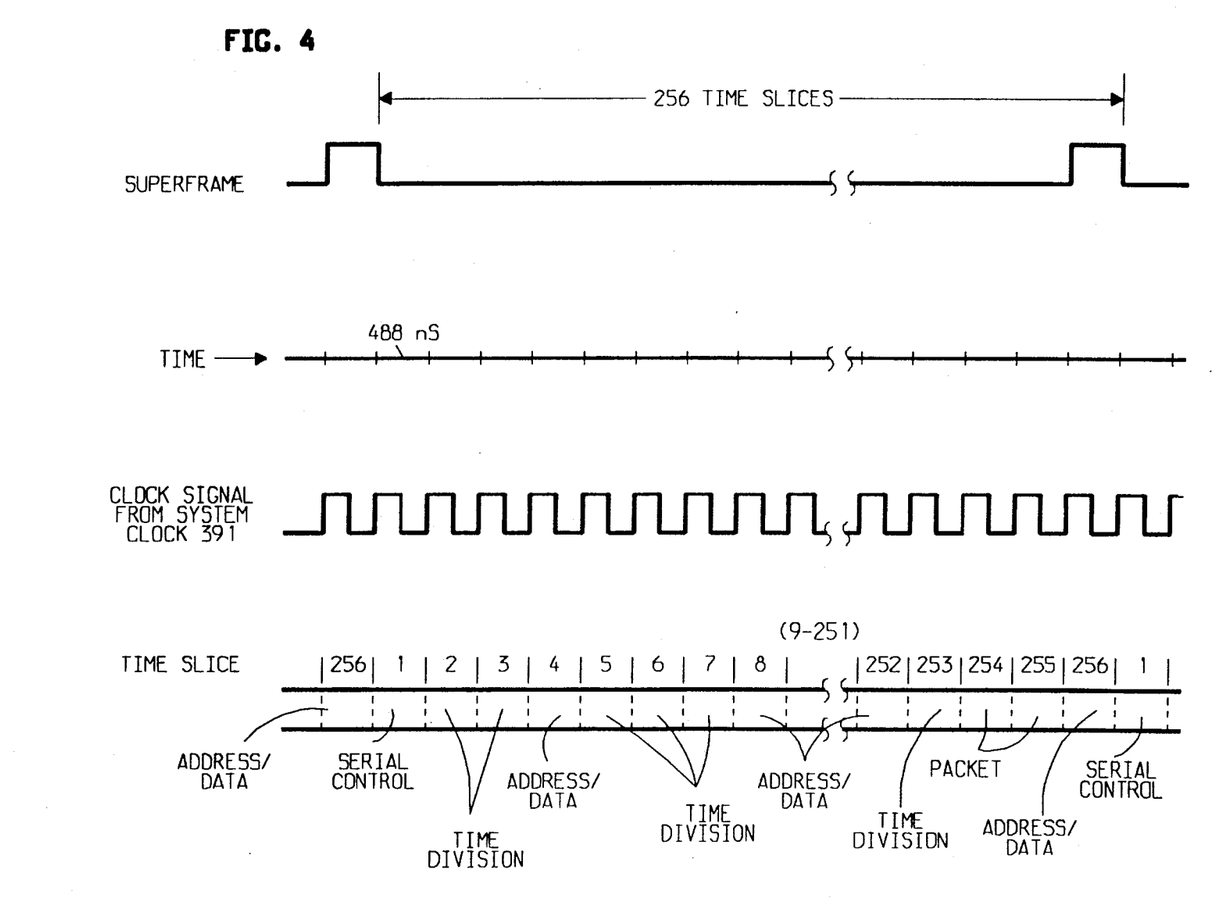
FIG. 4 describes the timing of access to a multipurpose bus within the system of FIG. 1.

To this end, system clock 391 on manager circuit pack 107 generates a clock signal of 2.048 MHz. Bus manager 397 takes in the clock signal with which it divides the time into superframes of time slices, not to be confused with frames of time slots associated with time division bus 212 as described earlier. In the present illustrative embodiment, a time slice is defined as a unit of time in which multipurpose bus 14 is configured as a particular type of bus. FIG. 4 is a timing diagram indicating the allocation of time slices for use of multipurpose bus 14 as different buses. As seen in FIG. 4, a superframe is comprised of 256 time slices. Each time slice is as long as a cycle of the clock signal generated by system clock 391 or 1/2.048 MHz=488 ns. This results in $2.048 \times 10^6/256 = 8,000$ superframes of time slices per second. This being so, the superframe signal in this particular embodiment is of frequency 8 kHz and is derivable from the output of system clock 391.

To satisfy the above-described proportion of usage of multipurpose bus 14 as different buses, bus manager 397 illustratively assigns on a per superframe basis, 154 time slices during which bus 14 is used as time division bus 212, 30 time slices as packet bus 215, eight time slices as serial control bus 213 and 64 time slices as address/data bus 214. Time slices for the different buses are distributed over every superframe in the following manner: The first and $(1+32i)$th are reserved to be serial control time slices, where $i=1, 2, 3 \ldots 7$. Every fourth, that is 4th, 8th, 12th . . . 256th, are reserved to be address/data time slices. Packet time slices are arranged in 15 pairs, as explained hereinbelow, with the first of each pair occupying the $(198+4j)$th time slices, where $j=0, 1, 2 \ldots 14$. Time division time slices are all of the time slices between the second and 255th inclusive, except those reserved to be either the serial control address/data or packet time slices.

It is noteworthy that in general the distribution of time slices allocated for each type of bus may vary from one system to another, in a manner so as to best fit the needs of a particular system user. The specific manner, of course, depends on the actual distribution of different traffic volumes switched through that particular system.

Referring back to FIG. 3, as the time slices allocated to a particular type of bus come into being, bus manager 397 broadcasts a predetermined bus assignment code specifying that particular type of bus. To this end, the predetermined code which is comprised of four bits is transmitted over aforementioned dedicated leads 14c through f of multipurpose bus 14. This predetermined code may be used to identify up to sixteen different types of bus. In this illustrative embodiment, code 0000 is arbitrarily assigned to identify the time division bus, 0001 to identify the packet bus, 0010 to identify the serial control bus, and 0011 to identify the address/data bus.

Circuit packs 100, 103, 105 and 109 are equipped with, respectively, assignment processors 303, 309, 317 and 321 to respond to the broadcast of the bus assignment code. As soon as the broadcast is made, each of the assignment processors enables the interface, if any, for the particular type of bus the bus assignment code identifies, and disables every other interface to multipurpose bus 14 on its associated circuit pack. The net effect is, for example, during the time slices when multipurpose bus 14 is assigned to be configured as time division bus 212, circuit packs 100 and 103, having, respectively, multipurpose time division interfaces 301 and 311, are electrically connected to bus 14 via those enabled interfaces. Simultaneously, circuit packs 105 and 109, lacking such time division interfaces, are electrically insulated from multipurpose bus 14 because of their disabled interfaces. This being so, during those time slices, circuit packs 100 and 103 may intercommunicate over multipurpose bus 14 as if the latter were time division bus 212. Similarly, when bus 14 is configured as packet bus 215, multipurpose packet interfaces 313 and 315 are enabled while other interfaces are disabled; when bus 14 is configured as serial control bus 213, multipurpose serial control interfaces 305, 307 and 319 are enabled while other interfaces are, again, disabled; and when bus 14 is configured as address/data bus 214, multipurpose address/data interface 323 is enabled while other interfaces are, once again, disabled.

Figure 5:
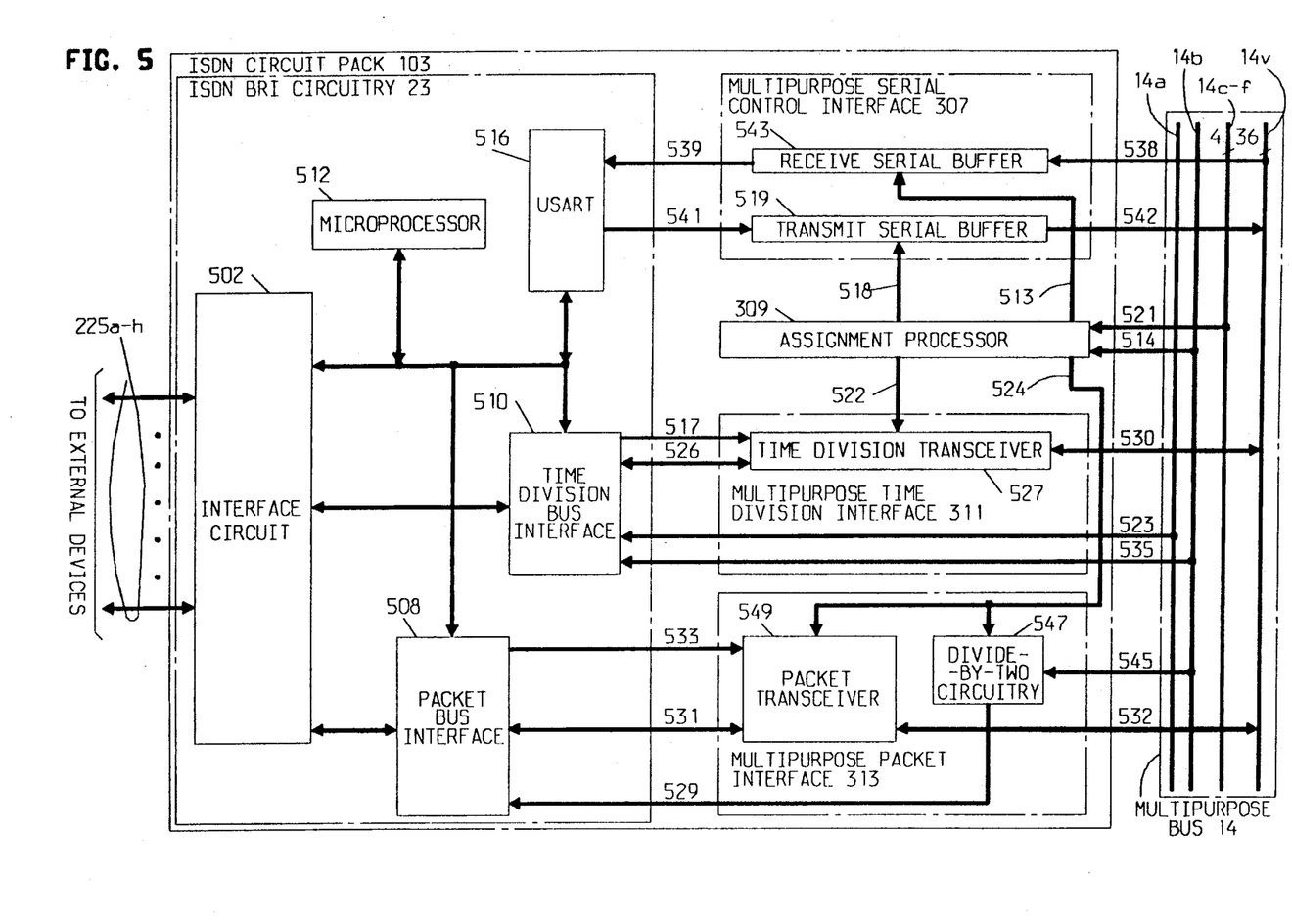
FIG. 5 is a block diagram of a modular circuit pack which communicates over the multipurpose bus within the system of FIG. 1.

FIG. 5 illustrates the detailed connections between a prior art circuit pack circuitry, for example, ISDN BRI circuitry 23, and the aforementioned interfaces for multipurpose bus 14. FIG. 5 is, in fact, a block diagram of ISDN circuit pack 103, showing the architecture thereof. Circuit pack 103 comprises besides ISDN BRI circuitry 23, multipurpose serial control interface 307, multipurpose assignment processor 309, multipurpose time division interface 311 and multipurpose packet interface 313.

Specifically, interface circuit 502 within ISDN BRI circuitry 23 communicates with external devices via ISDN BRI interfaces 225a through h. Interface circuit 502 sorts out voice/data packets and 64 kb/s synchronous traffic from the bit streams received from those interfaces. Thereafter, interface circuit 502 sends the separate packets and synchronous traffic to, respectively, packet bus interface 508 and time division bus interface 510. Conversely, interface circuit 502 receives packet voice/data from packet bus interface 508, and 64 kb/s synchronous traffic from time division bus interface 510, and delivers the same in an ISDN format to the external devices via ISDN BRI interfaces 225a through h.

Packet bus interface 508 buffers data/voice packets received from interface circuit 502 until it successfully seizes multipurpose bus 14 through arbitration during the time slices assigned for using bus 14 as packet bus 215. That is, not until then, packet bus interface 508 does not release the buffered data/voice packets to multipurpose packet interface 313. Before a packet is released on to multilead 531, packet bus interface 508 prepends to the packet a predetermined address of a circuit pack for which it is destined. This predetermined address is communicated previously from bus manager 397 to interface 508 via microprocessor 512 to be described. Conversely, interface 508 reads the prepended addresses of packets received from multipurpose bus 14 via multilead 531 and selectively buffers those addressed thereto. After properly assembling the buffered packets, packet bus interface 508 transmits the packets thus assembled to interface circuit 502.

Time division bus interface 510 directs 64 kb/s synchronous traffic received from interface circuit 502 on to multilead 526 during time slots indicated by bus manager 397 through microprocessor 512. Conversely, interface 510 is instructed by bus manager 397 to retrieve data bytes from multilead 526 during certain time slots. These data bytes originate from multipurpose bus 14 during the time slices at which it is used as time division bus 212. Interface 510 assembles the retrieved data bytes and provides 64 kb/s synchronous bit streams to interface circuit 502.

Microprocessor 312 orchestrates the operation of interface circuit 502, packet bus interface 508, and time division bus interface 510. Microprocessor 312 communicates control information with bus manager 397 via multipurpose bus 14 during time slices at which bus 14 is used as serial control bus 213. Such communications are properly negotiated by universal synchronous asynchronous receiver transmitter (USART) 416 of conventional design.

Depending on the bus assignment code received from multipurpose bus leads 14c through f as described before, an assignment processor enables/disables various multipurpose bus interfaces. Specifically, assignment processor 309 takes in a clock signal from multipurpose bus lead 14b via lead 514. The clock signal is of frequency 2.048 MHz provided on to lead 14b by aforementioned system clock 391. With the clock signal, assignment processor 309 clocks in the four-bit bus assignment code from multilead 521 at the beginning of every time slice. Based on the particular bus assignment code, assignment processor 309 determines what particular bus type that multipurpose bus 14 is to become. Upon the determination thereof, assignment processor 309 enables only the interface for that particular bus type. To this end, processor 309 sends to multipurpose serial control interface 307 appropriate enable/disable signals via lead 518 and lead 513, multipurpose time division interface 311 via lead 522, and multipurpose packet interface 313 via lead 524.

Multipurpose serial/control interface 307 serves as an interface between multipurpose bus 14 and USART 516. Interface 307 is comprised of receive serial buffer 543 and transmit serial buffer 519. When enabled, receive serial buffer 543 which is a standard transparent latch receives serial data and a serial clock signal. The latter are provided from two predetermined variable leads of 14v via multilead 538. These two predetermined variable leads act as the respective aforementioned data and clock leads of serial control bus 213. The serial clock signal is of frequency 9.6 kHz and is provided by bus manager 397 on to the acting clock lead of 14v. This clock signal originates from clock 395 on manager circuit pack 107 of FIG. 3. Clock 395 generates a 9.6 kHz pulse sequence which is fed to manager 397 which, in turn, generates the serial clock signal on to multipurpose bus 14 during the serial control time slices. USART 516 clocks in the serial data at 9.6 kb/s with the serial clock signal, where the serial data and the serial clock signal are provided thereto by receive serial buffer 543 via multilead 539. Conversely, USART 516 clocks out serial data on to lead 541 to be stored in transmit serial buffer 519 which is of conventional design. When enabled, buffer 519 passes the serial data on to the acting data lead of 14v via lead 542.

Since receive serial buffer 543 receives the 9.6 kb/s serial data and the 9.6 kHz serial clock signal from multipurpose bus 14 only during the serial control time slices, buffer 543, in effect, receives samples of the same during those time slices. In this case, the frequency of the serial control time slices is eight per superframe or 64 kHz. Thus, what buffer 543 receives are 64 kHz sampled versions thereof. In fact, in the present embodiment receive serial buffer 543 performs a sample-and-hold function to reconstruct the serial data and the serial clock signal for use of USART 516.

It should also be pointed out that during a transition from one type of time slice to another type, the state of variable leads 14v of multipurpose bus 14 is momentarily indeterminate. Glitches may occur on those leads during such transitions. In particular, when multipurpose bus 14 is transitioned to become serial control bus 213 at the beginning of a serial control time slice, a glitch on the acting clock lead of 14v may pass through then enabled receive serial buffer 543 and falsely trigger USART 516 as a serial clock signal. Thus, accordingly, USART 516 may clock in erroneous serial data. To avoid this undesirable result, assignment processor 309 delays in sending via lead 513 a receive enable signal to activate receive serial buffer 543. This delay starts from the beginning of every serial control time slice and lasts for a predetermined period long enough to avoid the glitch. (In this particular illustrative embodiment, the delay is half as long as a time slice.)

Because of the transmit and receive mechanism inherent in time division bus interface 510 and packet bus interface 508, the above-described glitches do not affect the time division communications and the packet communications, even though assignment processor 309 does not delay in enabling either one of the interfaces. This stems from the fact that both time division bus interface 510 and packet bus interface 508 transmit and receive at the trailing edge of their respective clock signals which are described hereinbelow. In particular, time division bus interface 510 transmits and receives at the end of its clock period which coincides with the end of a time division time slice. Thus, the glitches, which only appear shortly at the beginning of a time slice, are avoided. Similarly, because a packet clock period, as explained hereinbelow, lasts for two packet time slices, and packet bus interface 508 transmits and receives at the end of the second time slice of the pair, it thus also misses the glitches.

Multipurpose time division interface 311 is comprised of time division transceiver 527, lead 523 and lead 535. Lead 523 conveys to time division bus interface 510 the superframe signal carried by multipurpose bus lead 14a. The superframe signal contains superframe pulses whose frequency is, as described before, 8 kHz. The superframe signal is generated on to lead 14a by bus manager 397 which derives it from the 2.048 MHz clock signal of system clock 391. This superframe signal which is necessary for the operation of bus manager 397 is provided in system 10 in anticipation of the inclusion of circuit packs which may utilize the signal for synchronization purposes. For example, in the present illustrative embodiment, such a superframe signal is used by time division bus interface 517 as the aforementioned 8 kHz frame signal transported on time division bus 212.

Time division bus interface 510 also requires a clock signal whose period defines the time slots associated with time division bus 212 as mentioned before. Lead 535 conveys such a clock signal of frequency 2.048 MHz from multipurpose bus lead 14b to time division interface 510. It is obvious at this point that coincidentally, both the time slice and the time slot in this illustrative embodiment are of the same length which is 488 ns long. This being so, bus manager 397, which is responsible for allocating both of the time slots and time slices, has to assign every time slot to match a time division time slice in a synchronous manner. That is, each occurrence of the time slot must coincide in time with that of such a time slice.

Time division transceiver 527 is of conventional design. When enabled by assignment processor 309 during a time division time slice, transceiver 527 can operate in either a transmit mode or a receive mode. This being so, time division bus interface provides a mode indicator via lead 517 to transceiver 527. This indicator, which was previously used internally in time division bus interface 510, is now used to direct transceiver 527 to be in one of the two modes. In the transmit mode, transceiver 527 transfers during a time division time slice an ensemble of eight parallel data bits from multilead 526 on to multilead 530 and therefrom to multipurpose bus 14. The eight parallel bits are thereupon transported on, specifically, eight predetermined leads of 14v of multipurpose bus 14. These eight predetermined leads act as the respective eight data leads of time division bus 212. In the receive mode, transceiver 527 conversely transfers another ensemble of eight parallel bits from multipurpose bus 14 acting as time division bus 212 on to multilead 526.

Multipurpose packet interface 313 is comprised of divide-by-two circuitry 547 and packet transceiver 549. Specifically, when enabled by assignment processor 309 during a packet time slice pair, divide-by-two circuitry 547 takes in via lead 545 the 2.048 MHz clock signal from multipurpose bus lead 14b. Circuitry 547, in a standard way, derives from its input signal a clock signal of 1.024 MHz, half the frequency thereof. The clock signal thus derived is provided to packet bus interface 508 via lead 529. It should be noted at this point the packet clock frequency is changed from 1 MHz as in system 20 to presently 1.024 MHz. This minor change is principally motivated by the fact that the latter frequency is easily derived from the output of system clock 391. Thus, a packet clock period now lasts for 976 ns, twice the length of a packet time slice. This being so, bus manager 397 allocates packet time slices in pairs to satisfy such a clock period.

The foregoing arrangement results in the packet clock signal being withheld from packet bus interface 508 by divide-by-two circuitry 547 when disabled during non-packet time slices. This advantageously freezes packet bus interface 508, thereby preventing it from undesirably contending for or transmitting and receiving over a packet bus while multipurpose bus 14 is configured otherwise.

When enabled by assignment processor 309, packet transceiver 549, like time division transceiver 527, operates in either a transmit mode or a receive mode. This being so, packet bus interface 508 also provides a mode indicator via lead 533 to transceiver 549. This indicator, which was previously used internally in packet bus interface 508, is now used to direct transceiver 549 to be in one of the two modes. In the transmit mode, transceiver 549 transfers, during a packet time slice pair, packets appearing on multilead 531 on to multilead 532 and therefrom on to multipurpose bus 14. These packets are thereupon transported on, specifically, twenty-three predetermined leads of 14v of multipurpose bus 14. These twenty-three predetermined leads act as the respective leads, except the packet clock lead, of packet bus 215. The exclusion of the packet clock lead results from the aforementioned scheme of deriving the 1.024 MHz packet clock signal from the clock signal transported on 14b, instead. In other words, 14b, in a sense, replaces the packet clock lead which is otherwise part of packet bus 215. In the receive mode, transceiver 549 conversely transfers packets from multipurpose bus 14 acting as packet bus 215 on to multilead 531.

Returning to FIG. 3, multipurpose time division interface 301 within analog circuit pack 100 is identical to multipurpose time division interface 311 as described before. Interface 301 is connected, in the same manner as interface 311, to a time division bus interface (not shown) within analog line circuitry 21 on one end and to multipurpose bus 14 on the other end. In addition, multipurpose serial control interfaces 305 within analog circuit pack 100 and 319 within circuit pack 105 are identical to multipurpose serial control interface 307 as described before. Interfaces 305 and 319 are connected, in the same manner as interface 307, to, respectively, a USART (not shown) within analog line circuitry 21 and another USART (not shown) within X.25 interface circuitry 27. And on the other end, interfaces 305 and 319 are connected to multipurpose bus 14. Moreover, multipurpose packet interface 315 within X.25 circuit pack 105 is identical to multipurpose packet interface 313 as described before. Interface 315 is connected, in the same manner as interface 313, to a packet interface (not shown) within X.25 circuitry 27 on one end and to multipurpose bus 14 on the other end.

Assignment processors 303, 317 and 321 are virtually identical to assignment processor 311 as described before. The particular design of each assignment processor in system 10, of course, depends on the types of the interfaces that processor controls.

Multipurpose address/data interface 323 within memory circuit pack 109 is enabled/disabled by assignment processor 321 sending thereto an appropriate signal via lead 325. When enabled, interface 323 on one end communicates with aforementioned RAM 24 data over multilead 327, memory address over multilead 329 and control/handshaking signals over multilead 331. On the other end, interface 323 transmits and receives information through multilead 333 to and from multipurpose bus leads 14$v$ acting as address/data bus 214.

Figure 6:
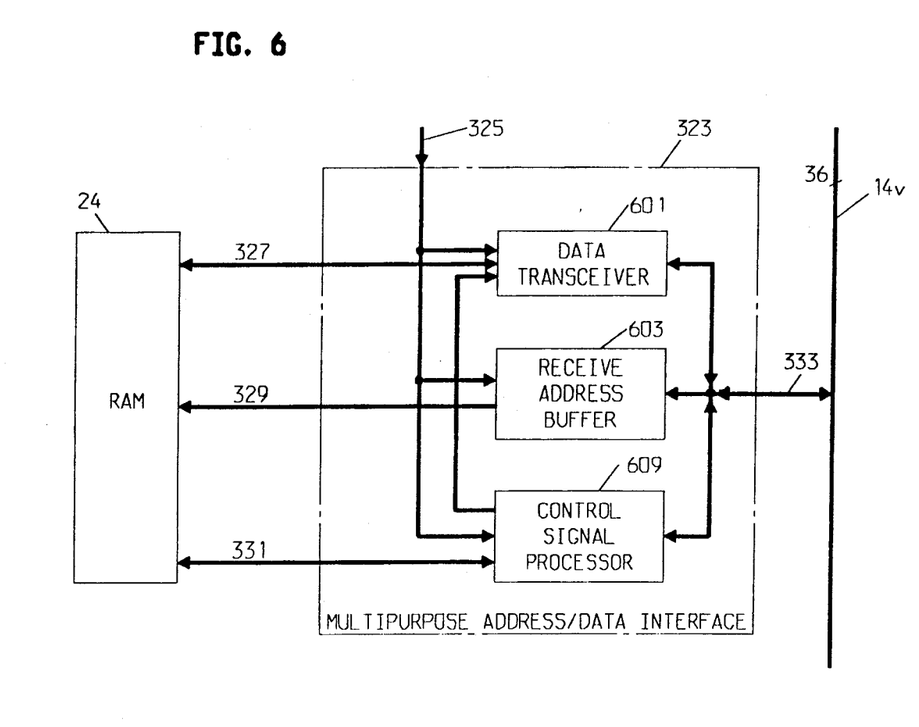
FIG. 6 is a block diagram of an interface for the multipurpose bus within the system of FIG. 1.

FIG. 6 shows a block diagram of multipurpose address/data interface 323. The signal on lead 325 simultaneously enables data transceiver 601, receive address buffer 603 and control signal processor 609 only during an address/data time slice. When bus manager 397 initiates to write to RAM 24 during the address/data time slice, the former sends a 16-bit data word, a 16-bit memory address and three control/handshaking signals, specifically, data valid, address valid and write signals on to multipurpose bus leads 14$v$. Through multilead 333, control signal processor 609 receives the data valid signal, the address valid signal and the write signal. Data transceiver 601, in response to the write signal which is provided thereto by control signal processor 609, takes in the 16-bit data word. Receive address buffer 603 receives the 16-bit address at which the data word is to be stored in RAM 24. Thereupon, control signal processor 609 presents the three control signals to RAM 24 via multilead 331 in a proper time sequence. RAM 24, in a standard way, removes the data word from data transceiver 601 and stores therein at the address provided by receive address buffer 603. In return, RAM 24 instantly generates within the same address/data time slice a data transfer acknowledge signal which is passed by control signal processor 609 on to one of multipurpose bus leads 14$v$. This acknowledge signal indicates to bus manager 397 the completion of the write transaction. Bus manager 397 is thereupon relieved to continue its normal operation. At the end of the time slice, data transceiver 601 and receive address buffer 603 are disabled by a disabling signal on lead 325. Responsive to that disabling signal, control signal processor resets the address valid, data valid and write signals in a proper order.

During another address/data time slice, when bus manager 397 initiates to read from RAM 24, the former sends a 16-bit memory address, a data valid signal, an address valid signal and a read signal on to multipurpose bus leads 14$v$. Through multilead 333, receive address buffer 603 receives the 16-bit address at which a 16-bit data word is to be retrieved from RAM 24. Control signal processor 609 receives the data valid signal, the address valid signal and the read signal. Thereupon, control signal processor 609 presents the three control signals to RAM 24 in a proper time sequence. RAM 24, in a standard way, retrieves the 16-bit data word at the designated memory address and sends it to data transceiver 601 to be buffered there. Data transceiver 601 at that time is in the transmit mode in response to the read signal provided by control signal processor 609. Thus data transceiver 601 transmits the 16-bit word to bus manager 397 over predetermined leads of 14$v$. Thereafter, RAM 24 instantly generates within the same address/data time slice a data transfer acknowledge signal which is passed by control signal processor 609 on to a predetermined lead of 14$v$. Upon receiving the data transfer acknowledge signal, bus manager 397 reads in the 16-bit data word. Again, at the end of the time slice, data transceiver 601 and receive address buffer 603 are disabled by a disabling signal on lead 325. Responsive to that disabling signal, control signal processor resets the address valid, data valid and read signals in a proper order.

The foregoing merely illustrates the principles of the present invention. It will thus be appreciated that those skilled in the art will be able to devise numerous arrangements which, although not explicitly shown or described herein, embody the principles of the invention and are thus within its spirit and scope.

For example, although in the disclosed embodiment, the multipurpose bus is used as one type of bus during each time slice, it is conceivable that the multipurpose bus may also simultaneously accommodate two or more different buses during a time slice. This can be accomplished by properly grouping the different buses to occupy the multipurpose bus so that for each time slice, the total number of leads of the different buses does not exceed the number of leads of the multipurpose bus. This being so, users of the different buses can communicate over their respective buses during the same time slice without interfering with one another.

Additionally, it may be desirable to have the users of the different buses to, for example, contend for use of the multipurpose bus through an arbitration scheme, or access the multipurpose bus in a time-division-multiplexed fashion or in a myriad of other schemes, rather than the assignment broadcast scheme as illustrated in the present disclosed embodiment.

In addition, although the multipurpose bus scheme is used in an electrical system, it can also be implemented in an optical system where for example, waveguides are used as the multipurpose bus leads.

Moreover, although the system disclosed herein is embodied in the form of various discrete electronic building blocks and components, the invention could equally as well be embodied in a system in which the functions of any one or more of those building blocks and components or indeed, all of the functions thereof, are realized, for example, by one or more appropriately programmed processors or by modifying the prior art circuitries. The latter is realized where, for instance, packet bus interface 508 of FIG. 5 may easily accommodate the function of the packet transceiver as well by merely adding to the interface an enable control function.

We claim:

1. A communication system wherein a plurality of devices communicate with one another through a shared communications bus which utilizers different bus protocols over time, said system comprising
    means for defining a plurality of successive time intervals for communicating signals on said bus,
    means for broadcasting assignment codes for said bus, each assignment code specifying a different one of a plurality of bus protocols, and each broadcasted assignment code being associated with a different set of defined time intervals, each set including at least one time interval, and
    means responsive to each broadcasted assignment code for providing signals to said bus in the defined plurality of time intervals which conform to the specified bus protocol associated with each such time interval.

2. The system of claim 1 wherein said bus has a plurality of leads and the number of leads is a function of a maximum number of leads required by any one of a plurality of said different bus protocols.

3. The system of claim 2 wherein a predetermined portion of said plurality of leads in said bus are variable leads whose functions vary with time and the number of variable leads is at least said maximum number.

4. The system of claim 1 wherein said defining means includes means for allocating said plurality of successive time intervals to individual ones of a plurality of said different bus protocols in accordance with an assignment broadcast scheme.

5. The system of claim 1 wherein said defining means includes means for allocating said plurality of successive time intervals to individual ones of a plurality of said different bus protocols in accordance with a bus arbitration scheme.

6. The system of claim 1 wherein said defining means includes means for allocating said plurality of successive time intervals to individual ones of a plurality of said different bus protocols in accordance with a time-division-multiplexed scheme.

7. A communication system comprising
a bus,
a plurality of communication devices connected to said bus, each communications device capable of processing signals which conform to at least one bus protocol and incapable of processing signals conforming to other bus protocols,
said bus connecting said communications devices to one another,
means for defining a plurality of successive time intervals,
means for broadcasting assignment codes on said bus, each assignment code specifying a different one of a plurality of bus protocols, and each broadcasted assignment code being associated with a different set of defined time intervals, each set including at least one time interval, and
means responsive to said broadcasted assignment code for isolating from said bus during each of said plurality of time intervals those communications devices which are unable to process signals conforming to the bus protocol associated with that time interval.

8. The system of claim 7 wherein said bus has a plurality of leads and the number of leads is a function of a maximum number of leads required by any one of said plurality of different bus protocols.

9. The system of claim 8 wherein a predetermined portion of said plurality of leads in said bus are variable leads whose functions vary with time and the number of variable leads is at least said maximum number.

10. The system of claim 7 wherein said defining means includes means for allocating said plurality of successive time intervals to individual ones of a plurality of said different bus protocols in accordance with an assignment broadcast scheme.

11. The system of claim 7 wherein said defining means includes means for allocating said plurality of successive time intervals to individual ones of a plurality of said different bus protocols in accordance with a bus arbitration scheme.

12. The system of claim 7 wherein said defining means includes means for allocating said plurality of successive time intervals to individual ones of a plurality of said different bus protocols in accordance with a time-division-multiplexed scheme.

13. A communications apparatus for use with a time shared bus, said bus coupling signals which conform to different bus protocols at different times, said apparatus comprising
means for receiving bus assignment codes, each code specifying one of a plurality of different bus protocols, and
means responsive to a subset of the received bus assignment codes for isolating said apparatus from said bus during time intervals associated with said subset of bus assignment codes.

14. The apparatus of claim 13 wherein said bus has a plurality of leads and the number of leads is a function of a maximum number of leads required by any one of a plurality of said different bus protocols.

15. The apparatus of claim 14 wherein a predetermined portion of said plurality of leads in said bus are variable leads whose functions vary with time and the number of variable leads is at least said maximum number.

16. The apparatus of claim 13 wherein said isolating means isolates said apparatus by disabling those interfaces associated with bus protocols specified by said subset of bus assignment codes.

17. A method for use in a communication system wherein a plurality of devices communicate with one another through a shared communications bus which utilizes different bus protocols over time, said method comprising the steps of
defining a plurality of successive time intervals for communicating signals on said bus,
broadcasting assignment codes for said bus, each assigment code specifying a different one of a plurality of bus protocols, and each broadcasted assignment code being associated with a different set of defined time intervals, each set including at least one time interval, and
providing, in response to each broadcasted assignment code, signals to said bus in the defined plurality of time intervals which conform to the specified bus protocol associated with each such time interval.

18. The method of claim 17 wherein said bus has a plurality of leads and the number of leads is a function of a maximum number of leads required by any one of a plurality of said different bus protocols.

19. The method of claim 18 wherein a predetermined portion of said plurality of leads in said bus are variable leads whose functions vary with time and the number of variable leads is at least said maximum number.

20. The method of claim 17 wherein said defining step further includes the step of allocating said plurality of successive time intervals to individual ones of said different bus protocols in accordance with an assignment broadcast scheme.

21. The method of claim 17 wherein said defining step further includes the step of allocating said plurality of successive time intervals to individual ones of said different bus protocols in accordance with a bus arbitration scheme.

22. The method of claim 17 wherein said defining step further includes the step of allocating said plurality of successive time intervals to individual ones of said different bus protocols in accordance with a time-division-multiplexed scheme.

23. A method for use in a communication system which comprises a bus, a plurality of communications devices connected to said bus, each communications device capable of processing signals which conform to at least one bus protocol and incapable of processing signals conforming to other bus protocols, said bus connecting said communications devices to one another, said method comprising the steps of
  defining a plurality of successive time intervals,
  broadcasting assignment codes on said bus, each assignment code specifying a different one of a plurality of bus protocols, and each broadcasted assignment code being associated with a different set of defined time intervals, each set including at least one time interval, and
  isolating, in response to said broadcasted assignment code, from said bus during each of said plurality of time intervals those communications devices which are unable to process signals conforming to the bus protocol associated with that time interval.

24. The method of claim 23 wherein said bus has a plurality of leads and the number of leads is a function of a maximum number of leads required by any one of a plurality of said different bus protocols.

25. The method of claim 24 wherein a predetermined portion of said plurality of leads in said bus are variable leads whose functions vary with time and the number of variable leads is at least said maximum number.

26. The method of claim 23 wherein said defining step further includes the step of allocating said plurality of successive time intervals to individual ones of a plurality of said different bus protocols in accordance with an assignment broadcast scheme.

27. The method of claim 23 wherein said defining step further includes the step of allocating said plurality of successive time intervals to individual ones of a plurality of said different bus protocols in accordance with a bus arbitration scheme.

28. The method of claim 23 wherein said defining step further includes the step of allocating said plurality of successive time intervals to individual ones of a plurality of said different bus protocols in accordance with a time-division-multiplexed scheme.

29. A method for use in a communications apparatus for use with a time shared bus, said bus coupling signals which conform to different bus protocols at different times, said apparatus comprising
  receiving bus assignment codes, each code specifying one of a plurality of different bus protocols, and
  isolating said apparatus, in response to a subset of the received bus assignment codes, from said bus during time intervals associated with said subset of bus assignment codes.

30. The method of claim 29 wherein said bus has a plurality of leads and the number of leads is a function of a maximum number of leads required by any one of a plurality of said different bus protocols.

31. The method of claim 30 wherein a predetermined portion of said plurality of leads in said bus are variable leads whose functions vary with time and the number of variable leads is at least said maximum number.

32. The method of claim 29 wherein said isolating means isolates said apparatus by disabling those interfaces associated with bus protocols specified by said subset of bus assignment codes.

* * * * *